United States Patent
Chou

(10) Patent No.: US 7,497,982 B2
(45) Date of Patent: Mar. 3, 2009

(54) METHOD FOR FORMING A CERAMIC ARTICLE USING SELF LUBRICATING BINDERS

(75) Inventor: Kevin Ying Chou, Painted Post, NY (US)

(73) Assignee: Corning Incorporated, Corning, NY (US)

(*) Notice: Subject to any disclaimer, the term of this patent is extended or adjusted under 35 U.S.C. 154(b) by 352 days.

(21) Appl. No.: 11/255,402

(22) Filed: Oct. 20, 2005

(65) Prior Publication Data

US 2007/0090577 A1    Apr. 26, 2007

(51) Int. Cl.
*B28B 3/20*    (2006.01)

(52) U.S. Cl. .................. 264/638; 264/631

(58) Field of Classification Search .......... 264/631, 264/638
See application file for complete search history.

(56) References Cited

U.S. PATENT DOCUMENTS

| | | | |
|---|---|---|---|
| 3,885,977 A | 5/1975 | Lachman et al. | 106/62 |
| 4,417,908 A | 11/1983 | Pitcher, Jr. | 55/523 |
| 4,772,580 A | 9/1988 | Hamanaka et al. | 502/439 |
| 5,085,720 A | 2/1992 | Mikeska et al. | 156/89 |
| 5,114,643 A | 5/1992 | Beall et al. | 264/63 |
| 5,114,644 A | 5/1992 | Beall et al. | 264/63 |
| 5,824,143 A | 10/1998 | Chalasani et al. | 106/181.1 |
| 6,372,033 B1 | 4/2002 | Chalasani et al. | 106/140.1 |
| 6,376,585 B1 | 4/2002 | Schofalvi et al. | 524/195 |
| 2002/0178707 A1 | 12/2002 | Vance et al. | 55/523 |
| 2003/0161959 A1 | 8/2003 | Kodas et al. | 427/376.2 |
| 2005/0089679 A1 | 4/2005 | Ittel et al. | 428/323 |

*Primary Examiner*—Mark Halpern
*Assistant Examiner*—Russell J Kemmerle, III
(74) *Attorney, Agent, or Firm*—Joseph M. Homa

(57) ABSTRACT

A method for producing a ceramic article comprising the steps of providing a plasticized ceramic precursor batch composition comprising an inorganic ceramic powder batch composition; a liquid vehicle; and an organic binder system comprising at least one organic lubricant grafted to a cellulose ether binder. An extruded green body can be formed from the plasticized ceramic precursor batch composition and subsequently fired under conditions effective to convert the extruded green body into a unitary ceramic article. Also provided are ceramic articles manufactured by the methods disclosed herein.

9 Claims, 2 Drawing Sheets

METHOD FOR FORMING A CERAMIC ARTICLE USING SELF LUBRICATING BINDERS

BACKGROUND OF THE INVENTION

1. Field of the Invention

The present invention relates to self lubricating binders for use in ceramic extrusion and more particularly to methods for manufacturing a ceramic body wherein the method comprises the use of such novel self-lubricating organic binders.

2. Technical Background

In the formation of ceramic bodies, e.g., silicon carbide, cordierite, mullite, alumina, or aluminum titanate bodies, plasticized mixtures of various inorganic powder batches are prepared which are then formed into various shapes. These plasticized mixtures should be well blended and homogeneous in order for the resulting shaped body to have relatively good integrity in both size and shape, and uniform physical properties. These mixtures typically further comprise organic additives such as binders, plasticizers, surfactants, lubricants, and dispersants as processing aids to enhance cohesion, plasticity, lubricity and/or wetting, and therefore to produce a more uniform batch. In forming processes, such as in extrusion, high pressures must be exerted on both the plasticized batch material and the equipment, e.g., an extrusion die.

Up to the present time, organic binders, such as cellulose ethers, and organic lubricants, such as monocarboxylic acids have been used individually in these batch compositions in order to ensure good batch cohesion and lubrication against the die and other equipment parts, thus insuring longer equipment life, good extruded product quality, and low extrusion pressure. Several of the many U.S. patents that relate to forming ceramic honeycombs by forming batch mixtures containing such raw materials include U.S. Pat. Nos. 4,772,580, 3,885,977, 4,417,908, 5,114,643, and 5,114,644.

However, there still remains an ongoing need to improve upon the ability to provide homogenous plasticized mixtures comprising such binder and lubricant additives in order to improve product quality, and the life of processing equipment. More specifically, increasing the homogeneity of binder and lubricant additives within the plasticized mixtures can provide enhanced lubrication characteristics and thus enable the use of less severe processing conditions and ultimately less expensive processing equipment.

SUMMARY OF THE INVENTION

Among several aspects, the present invention provides novel self-lubricating organic binders for use in manufacturing sintered or reaction-sintered ceramic articles via processes involving the extrusion of plasticized inorganic powder batches.

In a first aspect, the present invention provides a method for producing a ceramic article comprising the steps of providing a plasticized ceramic precursor batch composition comprising an inorganic ceramic powder batch composition; a liquid vehicle; and an organic binder system comprising at least one organic lubricant grafted to a cellulose ether binder. An extruded green body is formed from the plasticized ceramic precursor batch composition and subsequently fired under conditions effective to convert the extruded green body via sintering or reaction-sintering into a unitary ceramic article.

Sintered ceramics formed of glasses, glass-ceramics or ceramics, the latter comprising principal crystalline phases of, for example, alumina or silicon carbide, are examples of ceramic articles that can be so made. Examples of particularly preferred reaction-sintered ceramics are ceramics comprising principal crystalline phases of cordierite or aluminum titanate.

In a second aspect, the present invention provides a plasticized ceramic precursor batch composition comprising an inorganic ceramic powder batch composition; a liquid vehicle; and a binder system comprising at least one monocarboxylic acid lubricant grafted to a cellulose ether binder.

In a third aspect, the present invention provides a ceramic article produced by the methods described herein.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DETAILED DESCRIPTION OF THE INVENTION

Figure 1:
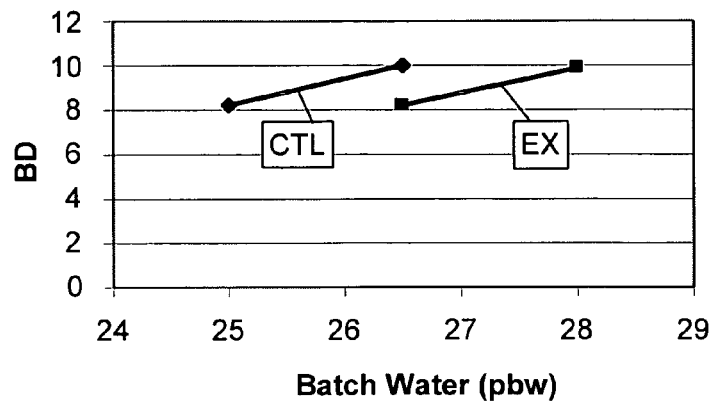
FIG. 1 is chart showing ball drop data plotted against water call data representative of inventive and conventional examples.

As briefly mentioned above, in a first aspect the present invention provides a method for producing a ceramic article of sintered or reaction-sintered composition. The method comprises providing a plasticized ceramic precursor batch composition comprising an inorganic ceramic powder batch composition; a liquid vehicle; and an organic binder system comprising at least one organic lubricant grafted to a cellulose ether binder. The plasticized ceramic precursor composition is then formed into a green body having a desired size and shape and subsequently fired under conditions effective to convert the green body into a ceramic article having crystal phases dictated principally by the selected inorganic powder batch composition and additionally by the firing conditions, as is known in the art.

The inorganic ceramic powder batch mixtures or compositions which are suitable for use in providing a plasticized ceramic precursor composition include those inorganic powder batch compositions which are capable of developing, upon firing, a predominant sintered structure comprised of ceramic, glass-ceramic, glass, or combinations thereof. It should be understood that, as used herein, combinations of glass, ceramic, and/or glass-ceramic compositions includes both physical and/or chemical combinations, e.g., mixtures or composites.

Exemplary and non-limiting inorganic powder materials suitable for use in these inorganic ceramic powder batch mixtures can include cordierite, mullite, clays such as kaolin clay, magnesium oxide sources such as talc, alumina forming sources including aluminas and their precursors, silica sources including silicas and their precursors, aluminates, lithium aluminosilicates, silicates, alumina-silica combinations such as mullite, feldspar, titania, zircon, zirconia, spinel, fused silica, and nitrides, carbides or borides, e.g., silicon carbide, silicon nitride or mixtures of these.

In one aspect, inorganic ceramic powder batch materials can be selected so to yield ceramic articles comprising cordierite, mullite, aluminum titanate, or mixtures of these on firing. For example, and without limitation, the inorganic ceramic powder batch composition can be selected to provide a ceramic article which comprises at least about 93% by weight cordierite, the cordierite consisting essentially of from about 49 to about 53 percent by weight $SiO_2$, from about 33 to about 38 percent by weight $Al_2O_3$, and from about 12 to about 16 percent by weight MgO. To this end, and exemplary inorganic cordierite precursor powder batch composition can comprise about 33 to about 41 weight percent of aluminum oxide sources, about 46 to about 53 weight percent of silica sources, and about 11 to about 17 weight percent of magnesium oxide sources. Some exemplary ceramic batch material compositions for forming cordierite are those disclosed in U.S. Pat. No. 3,885,977 which is herein incorporated by reference.

The inorganic ceramic powder batch materials can be synthetically produced materials such as oxides, hydroxides, and the like. Alternatively, they can be naturally occurring minerals such as clays, talcs, or any combination of these. Thus, it should be understood that the present invention is not limited to the types of powders or raw materials, as such can be selected depending on the properties desired in the final ceramic body.

In one aspect, an exemplary and non-limiting magnesium oxide source for forming a cordierite containing ceramic can comprise talc. Exemplary alumina sources can include aluminum oxides or a compound containing aluminum which when heated to sufficiently high temperature yields essentially 100% aluminum oxide. If desired, the alumina source can comprise a dispersible alumina forming source. Suitable silica sources can in one aspect comprise clay or mixtures, such as for example, raw kaolin, calcined kaolin, and/or mixtures thereof. Exemplary and non-limiting clays include non-delaminated kaolinite raw clay and delaminated kaolinite. The silica forming source can further comprise, if desired a silica raw material including fused $SiO_2$; colloidal silica; crystalline silica, such as quartz or cristobalite, or a low-alumina substantially alkali-free zeolite.

In general, the inorganic ceramic powder materials are fine powder (in contrast to coarse grained materials) some components of which can either impart plasticity, such as clays, when mixed with a liquid vehicle such as water, or which when combined with organic materials such as methyl cellulose or polyvinyl alcohol can contribute to plasticity.

The inorganic ceramic powder batch composition comprising the aforementioned ceramic forming raw materials can then be mixed together with an organic binder system and a liquid vehicle in order to provide the plasticized ceramic precursor composition and to provide an extrudable mixture that is formable and/or moldable. As understood by one of ordinary skill in the art, the incorporation of an organic binder into the ceramic precursor batch composition can further contribute to the cohesion and plasticity of the plasticized ceramic batch mixture for shaping the mixture into a green body.

The organic binder system according to the present invention comprises at least one self lubricating organic binder. As used herein, a "self lubricating organic binder" refers to, without limitation, an organic binder, such as a cellulose ether and/or a derivative thereof, having at least one organic lubricant chemically grafted thereto. As understood by one of ordinary skill in the art, an organic lubricant, when present in a ceramic precursor batch composition, can contribute some lubricity and wetting to a batch composition. Typically, conventional ceramic extrusion processes utilize a separate organic binder component and a separate lubricant component as a mixture in order to provide adequate levels of cohesiveness and lubricity to the plasticized ceramic precursor composition. However, the mixedness of these organic components with the inorganic ingredients can vary widely from batch to batch. Further, inadequate or uneven mixing can cause localized rheological differences during the die flow, thereby causing defect formation on the skin or the web of the extruded ceramic article. Accordingly, by utilizing a binder system comprising a lubricant that has been grafted to the organic binder, the present invention provides a method for manufacturing a ceramic article that enables increased homogenization of these components within the plasticized ceramic precursor batch composition.

In preferred embodiments the self-lubricating organic binders according to the present invention comprise at least one mono-carboxylic acid lubricant chemically grafted to at least one cellulose ether binder. The grafted binder can be obtained by any conventionally known process for reacting a monocarboxylic acid with a cellulose ether or derivative thereof. For example, in one aspect, the grafted binder can be obtained by a conventional solution polymerization process whereby at least one cellulose ether and at least one monocarboxylic acid lubricant are dissolved in a suitable solvent and subsequently reacted under conditions of time and temperature effective to provide the grafted binder.

Alternatively, in another aspect, the grafted binder can be obtained by a conventional bulk polymerization process which can eliminate the need for the use of an added solvent. More specifically, during a bulk polymerization process, at least one monocarboxylic acid lubricant can be heated to a temperature sufficient to melt the organic acid at which point the monocarboxylic acid can sufficiently wet and coat the at least one organic binder particle enabling the grafting reaction to proceed in the absence of an added solvent.

A list of exemplary and non-limiting organic binders suitable for providing a self-lubricating organic binder according to the present invention include cellulose ether binders and derivatives thereof, such as, for example, methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures of any two or more thereof. Exemplary commercially available methylcellulose and methylcellulose derivatives are the Methocel® A4M and 20-333, F4, F40, and F240 available from Dow Chemical Co. The Methocel® A4M is a methylcellulose binder having a gel temperature of approximately 50° C.-55° C., and a gel strength of approximately 5000 g/cm$^2$ (based on a 2% solution at 65° C.). The Methocel® 20-333, F4, F40, and F240 are exemplary hydroxypropyl methylcellulose binders.

A list of exemplary and non-limiting lubricants which can be chemically grafted to at least a portion of the organic binder component includes monocarboxylic acids, such as, for example, saturated and/or unsaturated monocarboxylic acids. Exemplary and non-limiting saturated monocarboxylic acids suitable for use as grafted lubricants include stearic acid, palmitic acid, myristic acid, butyric acid, pentadecanoic acid, margaric acid, capric acid, caprylic acid, and arachidic acid. Likewise, a listing of exemplary and non-limiting unsaturated monocarboxylic acids suitable for use as grafted lubricants include oleic acid, tall oil, palmitoleic acid, linolenic acid, linoleic acid, ricinoleic acid, myristolenic acid, palmitoleic acid, vaccenic acid, elaidic acid, linoelaidicic acid, isolinoleic acid, gamma-inolenic acid, moroctic acid, eicosenoic acid, eicosadienoic acid, mead acid, eicosatrienoic acid, dihomo-g-linolenic acid, omega-3 arachidonic acid, arachidonic acid, timnodonic acid, erucic acid, docosadienoic acid, docosatrienoic acid, adrenic acid, docosapentaenoic acid, docosapentaenoic acid, docosahexaenoic acid, nervonic acid, and tetracosahexaenoic acid.

Any combination of lubricant and organic binder as set forth above can be used to provide a self-lubricating binder according to the instant invention. However, in one aspect and as discussed in the following examples, an exemplary self lubricating binder suitable for use according to the present invention can include methylcellulose, such as the F240 commercially available from Dow, grafted with stearic acid, such as the E120 available from Cognis. Furthermore, the self-lubricating binders of the present invention can be used in any amount suitable for forming a desired plasticized ceramic precursor batch composition. To this end, in one aspect, a plasticized ceramic precursor batch composition can comprise from about 0.1 weight % to about 6.0 weight % self-lubricating binder.

If desired, one or more added conventional non self-lubricating binders can be included in a plasticized ceramic precursor batch composition along with the self-lubricating binder described above. To this end, in one aspect, non self lubricating binders, such as those described above as suitable for the formation of the self lubricating binders of the instant invention can also be present in an amount from about 0 weight % to about 6.0 weight % of the plasticized ceramic precursor batch composition.

It should also be understood that one or more added conventional non-grafted lubricants can be included in a plasticized ceramic precursor batch composition along with the self-lubricating binder described above. To this end, in one aspect, a non grafted lubricant, such as those described above as suitable for the formation of the self lubricating binders of the instant invention can be present in an amount from about 0 weight % to about 3.0 weight % of the plasticized ceramic precursor batch composition.

Depending on the particular forming or shaping method, the particular end use application, and the nature and size of the equipment involved, the specific desired organic binder system components and the relative amounts of these components can vary. Thus, it should be appreciated that one of skill in the art will be able to readily obtain such optimum combinations through no more than routine experimentation.

It will also be appreciated upon practicing the present invention that the self lubricating binders described herein provide a novel single compound having excellent miscibility and lubricity which can partially or wholly replace the conventional mixtures of separate individual organic lubricants and organic binders, which required thorough homogenization. Further, since the lubricant and binder are chemically grafted, they will not tend to separate under high shear conditions that can exist in a twin screw mixer or other extrusion device. As such, the mixedness of the plasticized precursor batch is improved. Additionally, it is believed that carboxylic acid moiety of the grafted lubricant can form a more stable emulsion when the organic binder goes into solution which, in one aspect, can also facilitate bonding of hydrophobic particles, such as talc or clay, to the organic binder, thereby increasing cohesiveness of the plasticized mixture as well.

As exemplified in the appended examples and corresponding figures, certain advantages of the present inventive self lubricating binders and methods using same can be manifested in, for example, plasticized ceramic batch compositions that can be mixed uniformly with less power required. Further, these mixtures can also be shaped into bodies with less frictional forces exhibited on the material and the equipment than with conventional plasticized batch compositions. For example, in one aspect, these advantages can be quantified by a reduction in die pressures exhibited by extruded ceramic compositions comprising a self-lubricating binder of the instant invention as compared to extruded conventional ceramic compositions absent any self-lubricating binder. Thus, in one aspect, plasticized ceramic batch compositions comprising self-lubricating binders of the present invention can result in a reduction in extrusion die pressures in the range of from about 200 to about 700 psi as compared to conventional plasticized ceramic batch compositions absent self-lubricating binders.

Similarly, improved wetting characteristics can be manifested in lower amounts of energy required for the mixing. To this end, an exemplary method for measuring this reduced energy is to measure the mixing torque which is roughly proportional to the energy required for mixing. Thus, in one aspect, a plasticized ceramic batch composition comprising self-lubricating binders of the present invention can result in a reduction in mixing torques in the range of from about 15% to about 30% as compared to mixing torques required for similar conventional plasticized ceramic batch compositions absent a self-lubricating binder as taught herein.

Additionally, in some cases the properties of the resulting body, such as homogeneity, cohesiveness, skin quality, and knitting are also significantly improved. For example, the degree of knitting can provide an indication of the extent of skin cracking, such as cracking along the cell wall (web) lines displayed in cross sections of the body of honeycomb structures and fissures in the body. A relatively high degree of knitting is manifested by few or no such cracks visible to the naked eye.

It should also be understood that the plasticized ceramic precursor batch composition can, depending on the desired end use application, further comprises additional additives such as, for example, co-binders, dispersants, surfactants, and/or burnout agents. For example, in filter applications, such as in diesel particulate filters, it is sometimes appropriate to include a burnout agent in the plasticized ceramic mixture in an amount effective to obtain a porosity tailored for a particular filtration application. A burnout agent can be any particulate substance that "burns out" of the green body during the firing step. Exemplary and non-limiting burnout agents that can be used include organics that are solid at room temperature, elemental carbon, and combinations of these. Some examples are graphite, cellulose, starch, flour, and the like.

As stated above, the plasticized ceramic precursor batch composition further comprises at least one liquid vehicle or solvent component. In one aspect, the liquid vehicle component can comprise water. To this end, the liquid vehicle content can vary depending on the type of material used in order to in part optimum handling properties and compatibility with the other components in the ceramic batch mixture. Typically, the liquid vehicle content is usually in the range of from 20% to 50% by weight of the plasticized composition. In another aspect, depending on the component parts of the ceramic batch composition, it should be understood that organic solvents such as, for example, methanol, ethanol, or a mixture thereof can be used as the solvent vehicle.

The individual components of the binder system and the liquid vehicle can be mixed together with the inorganic ceramic powder batch composition in any suitable known manner to prepare an intimate mixture of the ceramic material, binder system and liquid vehicle capable of being formed into a ceramic body by, for example, extrusion. For example, the components of the binder system may be previously mixed with the liquid vehicle and then subsequently mixed together with the ceramic precursor batch composition. In this case, the entire portion of the binder system and liquid vehicle may be added at one time, or divided portions of the binder system and liquid vehicle may be added one after another at suitable intervals. Alternatively, the components of binder system may be added to the ceramic precursor batch composition one after another, or each previously prepared mixture of two or more components of the binder system may be added to the ceramic precursor batch composition. Further, the binder system may be first mixed with a portion of the ceramic precursor batch composition. In this case, the remaining portion of the ceramic precursor batch composition is subsequently added to the prepared mixture. In any case, the binder system and liquid vehicle should be uniformly mixed with the ceramic precursor batch composition in a predetermined portion. To this end, in one aspect, uniform mixing of the binder system, liquid vehicle and the inorganic ceramic precursor powder batch composition can be accomplished by, for example, a known conventional kneading process.

The resulting stiff, uniform, and extrudable plasticized ceramic precursor batch composition can then be shaped into a green body by any known conventional ceramic forming process, such as, e.g., extrusion, injection molding, slip casting, centrifugal casting, pressure casting, dry pressing, and the like. In an exemplary aspect, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The prepared ceramic green body can then be dried to remove excess moisture. The drying can be performed by hot air, or steam or dielectric drying, which can be followed by air drying. Once dried, the green body can thereafter be fired under conditions effective to convert the green body into a ceramic article comprising a sintered phase cordierite or other desired composition as described herein.

The firing conditions effective to convert the green body into a ceramic article can vary depending on the process conditions such as, for example, the specific composition, size of the green body, and nature of the equipment used. To that end, in one aspect the optimal firing conditions needed to obtain a ceramic article according to the instant invention will be obtainable by one of ordinary skill in the art through no more than mere routine experimentation. Thus, the present invention is not limited to specific firing temperatures and times. However, in one aspect, for plasticized mixtures that are primarily for forming mullite, the firing temperature can range from about 1400° C. to about 1600° C., and the firing times can range from about 1 hour to about 6 hours. Alternatively, for plasticized mixtures that are primarily for forming cordierite, the firing conditions comprise heating the green body to a temperature of between about 1350° C. to about 1450° C. The firing times for this aspect can range from approximately 20 to 80 hours, during which a maximum firing temperature can be reached and held for a soak time in the range of from about 5 hours to about 16 hours.

The ceramic bodies according to the present invention can have any convenient size and shape. However, in one aspect, the method of the present invention is well suited for the production of cellular bodies such as honeycombs. These cellular ceramic bodies find use in a number of applications such as catalyst carriers, filters such as diesel particulate filters, molten metal filters, regenerator cores, and the like.

Some examples of honeycombs produced by the process of the present invention, although it is to be understood that the invention is not limited to such, are relatively high strength, relatively low CTE, thin walled cordierite, aluminum titanate, or silicon carbide honeycomb substrates useful as catalyst carriers or fluid filters. Generally, honeycomb cell densities range from 235 cells/cm$^2$ (about 1500 cells/in$^2$) to 15 cells/cm$^2$ (about 100 cells/in$^2$). Further, the wall or web thicknesses typically range from about 0.05 to about 0.6 mm (about 2 to about 25 mils). It should however be understood that the particular desired size and shape of the ceramic body can depend on the application, e.g., in automotive applications by engine size and space available for mounting, etc. To this end, although the ceramic articles of the instant invention are, in one aspect, suitable for preparing thin-walled honeycombs, the claimed mixtures can also be used for thicker walled structures. For example, honeycombs structures having about 15 to about 30 cells/cm$^2$ (about 100 to about 200 cells/in$^2$) and about 0.30 to about 0.64 mm (about 12 to about 25 mil) wall thicknesses are well suited for diesel particulate filter applications.

EXAMPLES

To further illustrate the principles of the present invention, the following examples are put forth, which are, however, intended to be purely exemplary of the invention and not intended to limit the scope of what the inventors regard as their invention. Unless indicated otherwise, parts are parts by weight, temperature is degrees C. or is at ambient temperature, and pressure is at or near atmospheric.

Example 1

Preparation of Exemplary Self-Lubricating Binder

An exemplary grafted hydroxypropylmethyl cellulose-stearic acid self-lubricating binder was prepared by reacting 100 parts by weight of Dow F240 Methocel hydroxypropylmethyl cellulose with 21.4 parts of Cognis E120 stearic acid in a 3-neck reactor equipped with mechanical stirrer and under a constant nitrogen gas purge. The stearic acid was melted at approximately 53° C. at which point the melted stearic acid began to wet and coat the hydroxypropylmethyl cellulose particles. The reaction mixture was then heated to a temperature of at least 70° C. for approximately 1 hour to ensure a complete reaction. After cooling to ambient or room temperature, the resulting grafted hydroxypropylmethyl cellulose-stearic acid binder was a compound having the general structure set forth below, as confirmed by conventional NMR analysis.

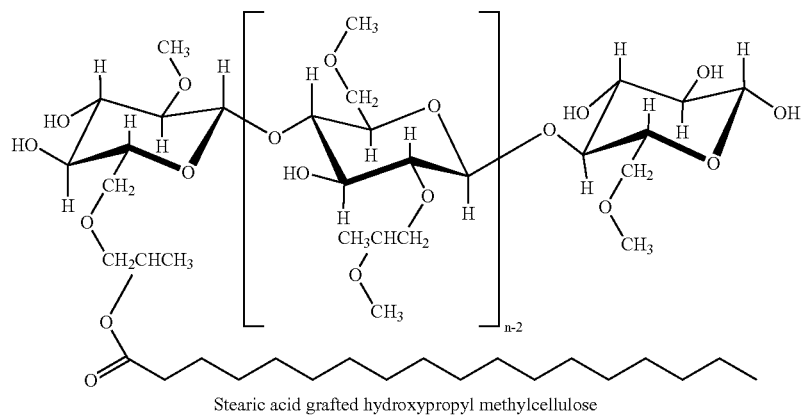

Stearic acid grafted hydroxypropyl methylcellulose

It should be noted that the level of grafting sites depend on the stoichiometry ratio of methylcellulose to stearic acid. It should also be understood that the ester linkage between stearic acid and methylcellulose could reside in any cellulose repeating unit in the backbone.

Example 2

Comparison of Conventional and Inventive Plasticized Compositions

An exemplary inventive plasticized cordierite precursor batch composition (referred to as composition "EX") comprising the self lubricating binder prepared from the procedure set forth in Example 1 (referred to herein as F240-g-E120) was made and compared to a conventional plasticized cordierite precursor batch composition that did not comprise a self-lubricating binder (referred to herein as "EX Control"). The specific formulations for the inorganic powder mixture and the vehicle/binder system compositions of the inventive and conventional plasticized compositions are set forth in Tables 1 and 2, respectively.

The respective batch compositions were prepared by mixing the methylcellulose and/or grafted methylcellulose with all inorganic ingredients in a Littleford mixer for approximately 5 minutes. Afterward, water was introduced into the Littleford while mixing for approximately 1-2 minutes. Subsequently, an additional lubricant, a light hydrocarbon oil commercially available as Durasyn® 162 oil, was then introduced into Littleford while mixing for another 1-2 minutes. The moist batch compositions were then fed into an extruder whereby honeycomb extrudates were produced comprising 600 cells/in with approximately 4 mils web thicknesses. The outer diameter of the honeycomb was approximately 2 inches. The extruder was operated using screw speed set at 60 rpm.

TABLE 1

Composition "EX"

| BATCH COMPONENT | GRAMS | LBS | PPHI |
|---|---|---|---|
| Talc | 4562.70 | 10.05 | 40.3 |
| Calcined kaolinite clay | 2224.60 | 4.90 | 19.6 |
| Hydrous kaolinite clay | 1725.20 | 3.80 | 15.2 |
| Coarse alumina | 1577.65 | 3.48 | 13.9 |
| Silica | 681.00 | 1.50 | 6.0 |

TABLE 1-continued

Composition "EX"

| BATCH COMPONENT | GRAMS | LBS | PPHI |
|---|---|---|---|
| Fine alumina | 340.50 | 0.75 | 3.0 |
| Boehmite | 227.00 | 0.50 | 2.0 |
| Total Inorganics | 11350.00 | 25.00 | 100.00 |
| F240 (Methocel) | 222.46 | 0.49 | 1.96 |
| E120 (stearic acid) | 47.67 | 0.11 | 0.42 |
| Light oil lubricant | 624.25 | 1.38 | 5.50 |
| F240-g-E120 (grafted F240) | 115.77 | 0.26 | 1.02 |
| Water | 3007.75 | 6.63 | 26.50 |
| Total Batch | 15367.90 | 33.85 | 135.40 |

TABLE 2

Composition "EX Control"

| BATCH COMPONENT | GRAMS | LBS | PPHI |
|---|---|---|---|
| Talc | 4562.70 | 10.05 | 40.20 |
| Calcined kaolinite clay | 2224.60 | 4.90 | 19.60 |
| Hydrous kaolinite clay | 1725.20 | 3.80 | 15.20 |
| Coarse alumina | 1577.65 | 3.48 | 13.90 |
| Silica | 681.00 | 1.50 | 6.00 |
| Fine alumina | 340.50 | 0.75 | 3.00 |
| Boehmite | 227.00 | 0.50 | 2.00 |
| Total Inorganics | 11350.00 | 25.00 | 100.00 |
| F240 (Methocel) | 317.80 | 0.70 | 2.80 |
| E120 (stearic acid) | 68.10 | 0.15 | 0.60 |
| Light oil lubricant | 624.25 | 1.38 | 5.50 |
| Water | 3007.75 | 6.63 | 26.50 |
| Total Batch | 15367.90 | 33.85 | 135.40 |

The parameters used for comparing the inventive plasticized cordierite composition to the convention cordierite composition include ball drop stiffness, mixing torque, die pressures, tensile strength, and extrudate skin quality.

FIG. 1 shows ball drop data plotted against batch water content data representative of plasticized batch compositions like those in Tables 1 and 2, for various batch compositions containing various amounts of batch water. Ball drop is a measure of stiffness of an extruded honeycomb shape. The ball drop test consists of placing stainless steel ball with a predetermined weight onto the honeycomb shape and recording displacement after a measured time interval. A batch having a higher degree of stiffness resists the weight more, thus yielding less displacement or lower ball drop. A study of the ball drop displacements "BD" in FIG. 1, recorded as displacements in mm, indicates that compositions of the plasticized "EX" type comprising the self-lubricated binder exhibit, at higher batch water levels (parts by weight of water), the same range of ball drop stiffness as the EX Control type compositions "CTL".

Figure 2:
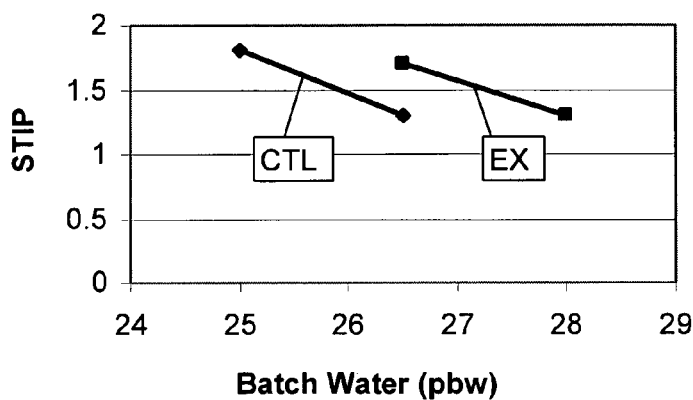
FIG. 2 is a chart of penetrameter stiffness (STIP) data plotted against water call data representative of inventive and conventional examples.

FIG. 2 shows penetrameter stiffness (STIP) data plotted against batch water level data (parts by weight) representative of the inventive (EX) and conventional (CTL) plasticized batch compositions. Penetrameter stiffness measures the relative force needed to penetrate an extruded ribbon of plasticized batch material to a fixed displacement. Higher penetrameter stiffness indicates higher stiffness. Penetrameter stiffness obtained from the ribbon normally correlates well with ball drop data obtained from extruded honeycomb substrates. Comparison of the data again indicates that plasticized compositions comprising the self-lubricated binder exhibit, at slightly higher batch water levels, the same stiffness levels as the control samples.

Figure 3:
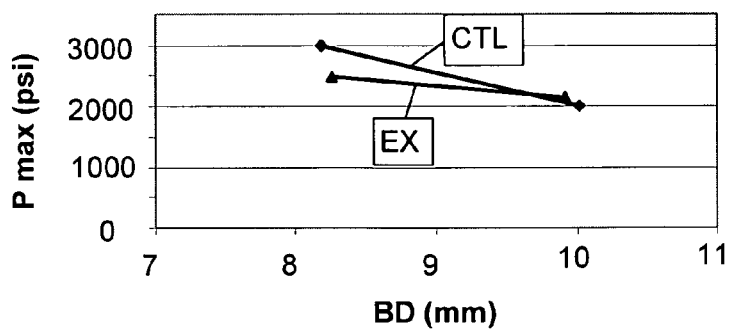
FIG. 3 is a chart of die pressures (P-max) data plotted against ball drop data representative of inventive and conventional examples.

FIG. 3 shows trend lines of maximum extrusion pressures (P-max) in a honeycomb extruder plotted against ball drop data for the batch materials being extruded. Comparison of the data indicates that, at ball drop values below about 10, the P-max die pressures of the inventive EX-type plasticized compositions are lower than those of CTL-type compositions, being approximately 500 psi lower at ball drop values nearing 8. As previously noted, such reduced extrusion pressures represent a significant processing advantage.

Figure 4:
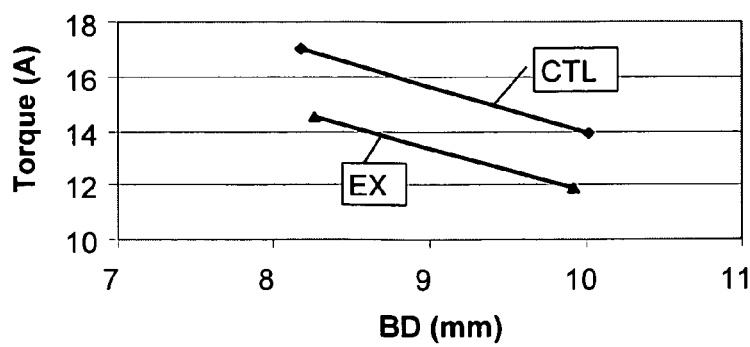
FIG. 4 is a chart of torque data plotted against ball drop data representative of inventive and conventional examples.

FIG. 4 shows trend lines for relative extruder screw torque (A) plotted against ball drop data for a series of inventive (EX-type) and conventional (CTL-type) plasticized batch compositions. Comparison of the data indicates that the inventive compositions comprising the self-lubricating binder exhibited a reduction in torque of approximately 15% relative to the measured torque of the conventional control compositions, at the same batch stiffness (Ball Drop) levels.

Figure 5:
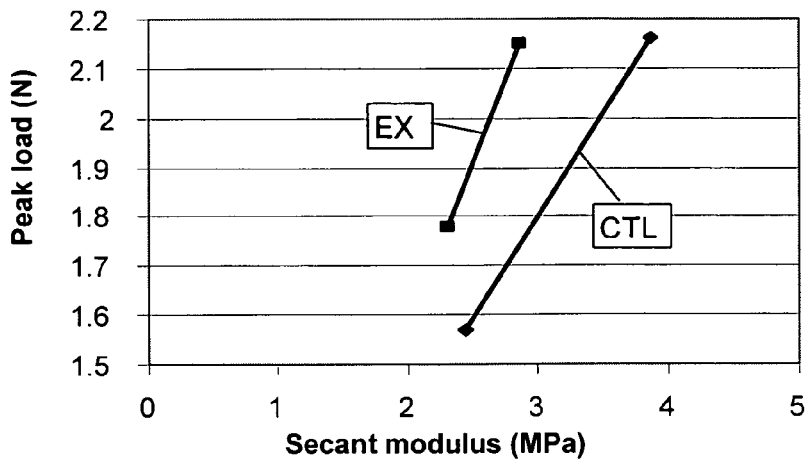
FIG. 5 is a chart of tensile strength data against secant modulus data representative of inventive and conventional examples.

FIG. 5 shows trend lines of tensile strength data plotted against secant modulus data representative of the inventive (EX-type) and conventional (CTL-type) plasticized batch compositions. Comparison of the data, obtained in accordance ASTM D638-03 for the testing of plastic materials, indicates that inventive compositions comprising self-lubricating binders exhibit tensile strengths approximately 15% higher than those of the conventional control compositions at equivalent secant modulus (relative material stiffness) values. The higher material strengths of the inventive batches are advantageous because the probability of forming defects in extruded shapes of the inventive batches is much lower than that for similarly extruded batches of conventional composition.

Figure 6:
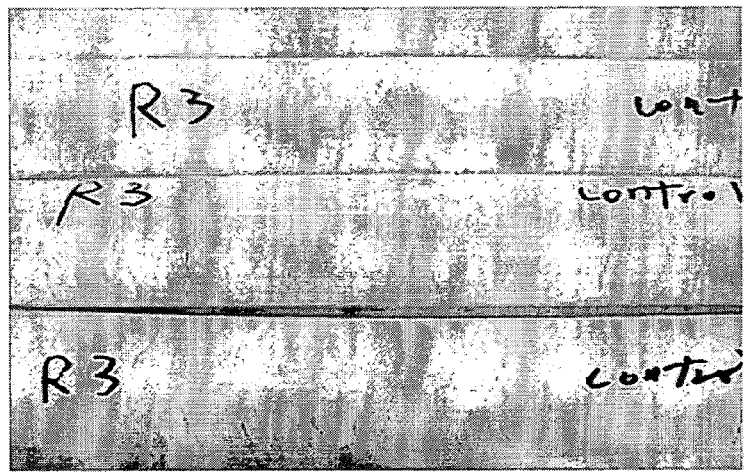
FIG. 6 is an illustration depicting skin quality for a series of extrudates formed from a conventional plasticized ceramic composition.
Figure 7:
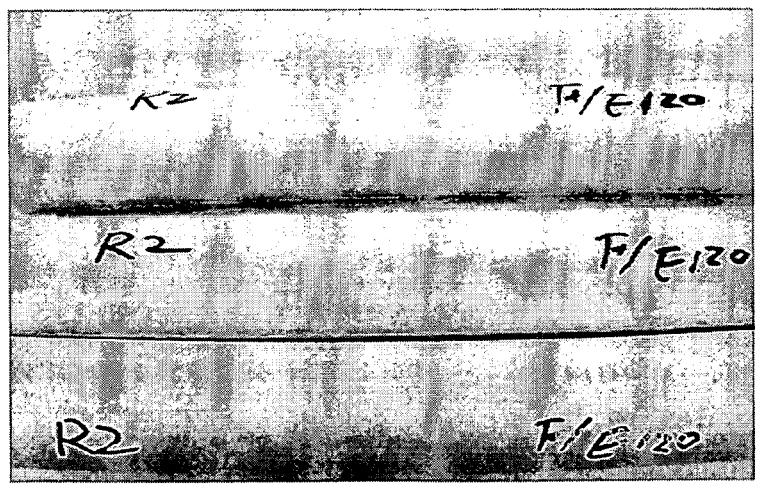
FIG. 7 is an illustration depicting visual skin quality for a series of extrudates formed from an inventive plasticized ceramic composition according to the instant invention.

One manifestation of improved extrusion behavior, illustrated in FIGS. 6 and 7 of the drawings, is a significant improvement in extruded honeycomb skin quality for extrudates formed from the inventive EX batches comprising self-lubricated binders. FIG. 6 shows a series of extrudates formed from the conventional plasticized compositions (CTL-type) not containing a self-lubricated binder, wherein air checks and surface fissure are clearly visible. FIG. 7 shows a series of extrudates formed from inventive plasticized compositions (EX-type) containing a self-lubricated binder evidencing noticeably improved smooth skin quality substantially absent of air checks and surface fissures.

What is claimed is:

1. A method for producing a ceramic article comprising the steps of:
   providing a plasticized ceramic precursor batch composition comprising:
   i) an inorganic ceramic powder batch composition
   ii) a liquid vehicle; and
   iii) an organic binder system comprising at least one organic lubricant grafted to a cellulose ether binder;
   forming an extruded green body from the plasticized ceramic precursor batch composition; and
   firing the green body under conditions effective to convert the extruded green body into a unitary ceramic article.

2. The method of claim 1, wherein the inorganic ceramic powder batch composition comprises a magnesium oxide source, an alumina forming source, and a silica forming source.

3. The method of claim 1, wherein the at least one lubricant comprises a monocarboxylic acid.

4. The method of claim 3, wherein the monocarboxylic acid is a saturated monocarboxylic acid.

5. The method of claim 3, wherein the monocarboxylic acid is an unsaturated monocarboxylic acid.

6. The method of claim 1, wherein the lubricant comprises stearic acid, tall oil, or a mixture thereof.

7. The method of claim 1, wherein the cellulose ether comprises methyl cellulose.

8. The method of claim 1, wherein the cellulose ether comprises hydroxypropyl-methyl cellulose.

9. The method of claim 1, wherein the binder system comprises stearic acid lubricant grafted to methyl cellulose binder.

* * * * *